(12) United States Patent
Lin et al.

(10) Patent No.: US 10,965,453 B2
(45) Date of Patent: Mar. 30, 2021

(54) SYSTEM AND METHOD FOR AUTHENTICATED ENCRYPTION BASED ON DEVICE FINGERPRINT

(71) Applicants: Beijing Jingdong Shangke Information Technology Co. Ltd., Beijing (CN); JD.com American Technologies Corporation, Mountain View, CA (US)

(72) Inventors: Yueh-Hsun Lin, Mountain View, CA (US); Wei Gao, Mountain View, CA (US); Jimmy Su, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 377 days.

(21) Appl. No.: 16/131,426

(22) Filed: Sep. 14, 2018

(65) Prior Publication Data

US 2020/0092090 A1    Mar. 19, 2020

(51) Int. Cl.
*H04L 9/08*   (2006.01)
*H04L 9/30*   (2006.01)

(52) U.S. Cl.
CPC .......... *H04L 9/0866* (2013.01); *H04L 9/0825* (2013.01); *H04L 9/0869* (2013.01); *H04L 9/30* (2013.01)

(58) Field of Classification Search
CPC ... H04L 9/0866; H04L 9/0869; H04L 9/0825; H04L 9/30; H04L 9/3242; H04L 63/0876; H04L 9/3297; H04L 9/0861
See application file for complete search history.

(56) References Cited

U.S. PATENT DOCUMENTS

| 8,667,265 | B1  | 3/2014  | Hamlet et al. |
| 10,153,907 | B2 * | 12/2018 | Xu .................... H04L 9/3263 |
| 2010/0211787 | A1 | 8/2010 | Bukshpun et al. |
| 2017/0230184 | A1 * | 8/2017 | Alwarappan .......... H04L 63/06 |

FOREIGN PATENT DOCUMENTS

| CN | 102664898 A | 9/2012 |
| GB | 2434724 A | 1/2007 |

* cited by examiner

*Primary Examiner* — Mohammed Waliullah
(74) *Attorney, Agent, or Firm* — China Science Patent & Trademark US LLC; Shanyun Lu

(57) ABSTRACT

A method and system for encryption and decryption. The system includes a user computing device, a root secret server, and a backend server. The root secret server has a root secret code, and when receiving a fingerprint of the user computing device, calculates a device secret code for that device using the fingerprint. When sensitive data needs to be encrypted, the user computing device calculates a data key for the data based on the device secret code and the data information, and encrypts the data. The backend server retrieves the root secret code from the root secret server, and in response to receiving the encrypted data, retrieves data information and calculates the data key to decrypt the data. Similarly, the backend server can encrypt data and the user computing device can decrypt data. The root secret code, the device code, and the data key form a three level encryption mechanism.

20 Claims, 11 Drawing Sheets

| DSecretEnvRequest Packet | | |
|---|---|---|
| Field Name | Type | Description |
| ciphertype | Int | Cipher algorithm of the asymmetric encryption. |
| dsecret_req_cipher | String | The actual DSecret request DSecretRequest_plain encrypted by the asymmetric public key of the RSecret Service. | e.g.,
{
    "ciphertype":2,
    "dsecret_req_cipher":"pZSUGyV4dDxSVnkzlSLKV\/VlVZgA8GliU6enFcEgelHW0t8FcqgKQ8G0\/Il47HE\/cA2OpXeFyPn9MvjVffLdj5pSt48SmsfstHFSqCouS8eEwRNkojLOGsYHPBxEwQOrH0545C+4ZlDTXwl7x0qzx9d0o\/YQx+l7sEQ0VaRB17Ss2+EHxCcR65EswDYcVE3LwyyvJL\/n4Z2t0CaaNyVd9KEweqmdl0CgwE7f9VtgTUD\/Zy5maBe5kCVAiFTm3l1nnChy2LPpxmBNwdJq\/KqcwC\/SukzaxT3+86+LiJojaxgvEocvgulynea2NtAnGUnfF3895olpGY5tx2sSGhrZdA=="
}

FIG. 9A

| Plain DSecretRequest Packet | | |
|---|---|---|
| Field Name | Type | Description |
| did | string | Device finger print like MAC (media access control) address or IMEI, uniquely identifying a mobile device. It is represented by the Devinfo{u}. |
| skey | String | A symmetric key randomly generated by the client app. It will be used to encrypt the DSecret sent back from the RSecret Service. |
| ciphertype | Int | Cipher algorithm of the symmetric encryption. |
| version | String | The version number of the application. |
| ts | long | The timestamp value of when the packet is generated. | e.g,
{
    "did":"J52GIQM2PFP6LXEKCZL2Y4KZNBWNFJBUZRIQSKJNRVJIRGBEHGTSYTJJXXGMYS3INYYEJGKDSGZF53H6KNWD5AUQWNRVZJ7ZAA4TQPSQ5L4GPLOKYEIA",
    "skey":"aBAQxxoDfdQ4zcXrgN72Pw==",
    "ts":1531848263,
    "ciphertype":0,
    "version":"1.0.0"
}

FIG. 9B

| DSecretResponse Pacekt | | |
|---|---|---|
| Field Name | Type | Description |
| status_code | Int | The status. 0 for Success or an error status code showing failure reason. |
| status_message | String | Status message corresponding to the status_code. |
| ciphertype | Int | Cipher algorithm, same as that in the DSecretRequest. |
| ridx | Int | The index of the root secret. The RSecret Service can select one from multiple root secrets when generating the dsecret. |
| dsecret_resp_cipher | String | The encrypted dsecret and encoded in the Base64 format. The encryption key is the "skey" from the DSecretRequest packet. | e.g.,
{
  "ciphertype" = 0,
  "dsecret_resp_cipher" = "HxQm7HV2K42AZOEBxpqT6weNAdosmjimQfO6NFEqxdDjm3DUH7zJ/9RH5O/t0ux3b6wa29FxQpN2V1irC8rxdw==",
  "ridx" = 1,
  "status_code" = 0,
  "status_message" = "Success."
}

FIG. 10

| RSecretEnvRequest Packet | | |
|---|---|---|
| Field Name | Type | Description |
| rsecret_req_cipher | String | The encrypted RSecretRequest encoded in the Base64 format. |
| ciphertype | Int | The cipher type used in above encryption and the key is fetched from the key management service. | e.g.,
{
  "ciphertype" = 0,
  "rsecret_req_cipher" =
"29FxQpN2V1iHxQm3b6warC8rxdw7HV2K42AZOEBxpqT6weNAdosmjimQfO6NFEqxd
Djm3DUH7zJ/9RH5O/t0ux=="
}

FIG. 11A

| RSecretRequest Packet | | |
|---|---|---|
| Field Name | Type | Description |
| service_name | String | The name of the Backend Service. |
| ts | Int | The timestamp value of when the packet is generated. |
| ridx | Int | The index of the currently used root secret starting from 0. | e.g.,
{
  "service_name" = "test",
    "ts":1531847839,
    "ridx":0
}

FIG. 11B

| RSecretEnvResponse Packet | | |
|---|---|---|
| Field Name | Type | Description |
| ciphertype | Int | The cipher type used in above encryption and the key is fetched from the key management service. |
| rsecret_res_cipher | String | The encrypted RSecretResponse encoded in the Base64 format. | e.g.,
{
  "ciphertype" = 0,
  "rsecret_rep_cipher" =
"weNAdosmjimQfO6NFEqxdDjm3D29FxQpN2V1iHxQm3b6warC8rxdw7HV2K42AZOEBxpqT6UH7zJ/9RH5O/t0ux=="
}

FIG. 12A

| RSecretResponse Packet | | |
|---|---|---|
| Field Name | Type | Description |
| status_code | Int | The status. 0 for Success or an error status code showing failure reason. |
| status_message | String | Status message corresponding to the status_code. |
| ts | Int | The timestamp value of when the packet is generated. |
| ridx | Int | The index of the currently used root secret starting from 0. |
| rsecret_string | String | The encrypted root secret (one or multiple). |
| rsecret_digest | String | The digest of the encrypted root secret and encoded in Base64 format. If multiple root secrets are returned, each root secret has its own corresponding digest. | e.g.,
{
  "ciphertype" = 0,
    "rsecret_string" = "xpqT6weNAdosmjimQfO6NFEqxdDjm3DUHHxQm7HV2K42AZOEB7zJ/9RH5O/t0ux3b6wa29FxQpN2V1irC8rxdw==",
    "rsecret_digest" =
"29FxQpN2V1irC8rxdwHxQm7HV2K42AZOEBxpqT6weNAdosmjimQfO6NFEqxdDjm3DUH7zJ/9RH5O/t0ux3b6wa==",
  "ridx" = 1,
  "status_code" = 0,
    "status_message" = "Success.",
    "ts":1531847839
}

FIG. 12B

| EncryptedDataPacket | | |
|---|---|---|
| Field Name | Type | Description |
| version | String | The client app's version number, e.g. 1.0.0 |
| ts | Long | The timestamp value of when the packet is generated. |
| hdid | String | The hash value of the device information (device finger print). It is derived with the formula: hdid = H(Devinfo(u)). |
| appname | String | The name of the client app. |
| ciphertype | String | Cipher algorithm. |
| ridx | Int | The index of the currently used root secret starting from 0. |
| cipher | String | The encrypted plaintext payload. | e.g.,
{
    "ciphertype":0,
    "cipher":{"age":"RtC8jwepLwltGzl6zYLLq3K6Ax6Koh7y2ucje1sHtuM=","password":"iU8lgpgJyBL+54PUhkx9EVzC9AlYmgvkFnjmwpSgwRc=","key":"94OPFOfrDi+aQL04D0RXW1rmyW\/sll3aUEl3XnmzFHQ=","address":"bZLbn2MTb\/ZQ7\/HA4Ea1zf3j6vXoEYYagVfuWV2l4Gw="},
    "ts":1531847839,
    "hdid":"x0Hyx+BX4gqOuNJDsXG5XXzmIyYfwj4AwtOBhaX9u2U=",
    "version":"1.0.0",
    "appname":"APPNAME_1",
    "ridx":0
}

FIG. 13

SYSTEM AND METHOD FOR AUTHENTICATED ENCRYPTION BASED ON DEVICE FINGERPRINT

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to authenticated encryption based on device fingerprint, and more particularly to systems and methods for authenticated application-layer encryption approach based on fingerprint of mobile devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Current transport layer or application layer encryption standards like secure socket layer (SSL)/transport layer security (TLS) or hypertext transfer protocol secure (HTTPS) allows client side, i.e., mobile applications (apps), to authenticate the server side with embedded server certificate signed with pre-installed trust certificate authorities (CAs). On the reverse side, the server can only authenticate the client based on some costly mechanisms, for example, account and password verification, security token, or even client certificates, which are hard to manage and deploy. Under an e-commerce platform which may support a few billion devices, key storage requirement would cause the server side a huge impact.

On the other side, plaintext data transferred over HTTP connection is unprotected (unless we adopt Hypertext Transfer Protocol Secure (HTTPS)), which exposes tremendous risk of data security if some extreme condition happens, e.g., load balance downgrades the traffic from HTTPS to HTTP. Traditionally, HTTPS is the way as an HTTP extension to offer secure communication over the network. However, HTTPS adds overhead and put extra load over network because (1) it requires to encrypt all transport-layer traffic including both sensitive data which requires protection and insensitive data which does not need protection; and (2) it requires client side credentials such as certificate with private key pair or preinstalled key, login account/password to be ready before it performs handshake.

Therefore, an unaddressed need exists in the art to provide a lightweight and easy-to-use key management between client and server.

SUMMARY

In certain aspects, the present disclosure relates to a method for encryption and decryption. In certain embodiments, the method includes:

sending, by a user computing device, a device fingerprint of the user computing device to a root secret server, wherein the root secret server has a root secret code, and the root secret server is configured to calculate, in response to receiving the device fingerprint, a device secret code using the device fingerprint and the root secret code, and send the device secret code to the user computing device;

calculating, by the user computing device, a data key using the device secret code, the device fingerprint, a name of an application generating data, and a timestamp of generating the data;

encrypting, by the user computing device, the data using the data key to form encrypted data;

encoding, by the user computing device, the encrypted data with the device fingerprint, the name of the application, and the timestamp to form an encoded data packet, and sending the encoded data packet to a backend server, wherein the backend server is configured to:

obtain the root secret code from the root secret server;

in response to receiving the encoded data packet, decode the encoded data packet to obtain the encrypted data packet;

calculate the data key using the root secret code obtained from the root secret server and the device fingerprint, the name of the application, and the timestamp from the encoded data packet; and decrypt the encrypted data packet using the data key.

In certain embodiments, the backend server is configured to calculate the data key by: calculating the device secret code using the root secret code and the device fingerprint, and calculating the data key using the device secret code, the device fingerprint, the name of the application and the time stamp.

In certain embodiments, the fingerprint mentioned above is a hash value of the fingerprint.

In certain embodiments, the method further includes, before the step of sending the device fingerprint: encrypting, by the user computing device, the device fingerprint using a public key retrieved from the root secret server, wherein the root secret server is further configured to decrypt the fingerprint by the root secret server using a private key associated with the public key, and the public key and the private key form a pair of asymmetric keys.

In certain embodiments, the root secret server is further configured to, before calculating the device secret code, validate the device fingerprint using a fingerprint validation service.

In certain embodiments, the root secret server is further configured to, before sending the device secret code to the user computing device: encrypt the device secret code using a randomly generated key provided by the user computing device, and the method further includes, before the step of calculating the data key by the user computing device: decrypting, by the user computing device, the encrypted device secret code received from the root secret server using the randomly generated key, and storing the obtained device secret code on the user computing device, wherein the randomly generated key is a symmetric key.

In certain embodiments, the root secret server is further configured to obtain a management key from a key management service;

the backend server is further configured to, before obtaining the root secret code from the root secret server: obtain the management key from the key management service; send a request for requesting the root secret code to the root secret server, the request encrypted by the management key, where the root secret server is further configured to decrypt the request using the management key, prepare a response having the root secret key and encrypted by the management key, and send the response to the backend server; and receive the response and decrypt the response using the management key to obtain the root secret code; and the management key is a symmetric key.

In certain embodiments, the data key is a symmetric key and the encrypted data packet is coded by JavaScript Object Notation (JSON).

In certain aspects, the present disclosure relates to a non-transitory computer readable medium storing computer executable code. The computer executable code, when executed at a processor of a user computing device, is configured to perform the method described above.

In certain aspects, the present disclosure relates to a method for encryption and decryption. The method includes:

obtaining, by a backend server, a root secret code from a root secret server;

decoding, by the backend server in response to receiving an encoded data packet from a user computing device, the encoded data packet to obtain an encrypted data packet, a device fingerprint, a name of the application, and a timestamp from the encoded data packet;

calculating a data key using the root secret code obtained from the root secret server and the device fingerprint, the name of the application, and the timestamp from the encoded data packet; and decrypting, by the backend server, the encrypted data packet using the calculated data key, where the user computing device is configured to send the device fingerprint of the user computing device to the root secret server, calculate the data key using the device secret code received from the root secret server, the device fingerprint, the name of the application generating the data, and the timestamp of generating the data, encrypt the data using the data key to form the encrypted data, encode the encrypted data with the device fingerprint, the name of the application, the timestamp to form the encoded data packet, and send the encoded data packet to the backend server; and where the root secret server is configured to calculate, in response to receiving the device fingerprint, the device secret code using the device fingerprint and the root secret code, and send the device secret code to the user computing device.

In certain embodiments the above mentioned device fingerprint is a hash value of the device fingerprint.

In certain embodiments, the user computing device is further configured to encrypt the device fingerprint using a public key retrieved from the root secret server, the root secret server is further configured to decrypt the fingerprint by the root secret server using a private key associated with the public key, and the public key and the private key form a pair of asymmetric keys.

In certain embodiments, the root secret server is further configured to, before calculating the device secret code, validate the device fingerprint using a fingerprint validation service.

In certain embodiments, the device secret code request sent from the user computing device to the root secret server includes a randomly generated key, the root secret server obtains the key when decrypting the service secret code request, and the root secret server is further configured to, before sending the device secret code to the user computing device:

encrypt the device secret code using the key provided by the user computing device, and the method further includes:

decrypting, by the user computing device, the encrypted device secret code received from the root secret server using the randomly generated key, and storing the obtained device secret code on the user computing device, wherein the randomly generated key is a symmetric key.

In certain embodiments, the method further includes:

obtaining, by the backend server, a management key from the key management service;

sending, by the back end server, a request for requesting the root secret code by the backend server to the root secret server, the request encrypted by the management key, wherein the root secret server is configured to obtain the management key from the key management service, decrypt the request using the management key, prepare a response having the root secret key and encrypted by the management key, and send the response to the backend server; and receiving, by the backend server, the response; and decrypting, by the backend server, the response using the management key to obtain the root secret code, where the management key is a symmetric key.

In certain embodiments, the data key is a symmetric key, and wherein the encrypted data packet is coded by JavaScript Object Notation (JSON).

In certain aspects, the present disclosure relates to a non-transitory computer readable medium storing computer executable code, where the computer executable code, when executed at a processor of a backend server, is configured to perform the method described above.

In certain aspects, the present disclosure relates to a system for encryption and decryption. In certain embodiments, the system includes a user computing device, a root secret server having a root secret code, and a backend server. The user computing device, the root secret server, and the backend server are configured to perform their functions as described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 9A schematically shows a format of a device secret code request (DSecretEnvRequest) packet and an example of the DSecretEnvRequest according to certain embodiments of the disclosure.

FIG. 9B schematically shows a format of an actual plaint text of the device secret code request (DSecretRequest_plain) and an example of the DSecretRequest_plain according to certain embodiments of the disclosure.

FIG. 10 schematically shows a format of a response (DSecretResponse) from the root secret service in response to receiving the request for a device secret code, and an example of the same according to certain embodiments of the present disclosure.

FIG. 11A schematically shows a format of an encrypted root secret code request (RSecretEnvRequest) packet and an example of the RSecretEnvRequest according to certain embodiments of the disclosure.

FIG. 11B schematically shows a format of a root secret cod request (RSecretRequest) packet and an example of the RSecretEnvRequest according to certain embodiments of the disclosure.

FIG. 12A schematically shows a format of an encrypted response packet (RSecretEnvRespose) in response to the root secret code request, and an example of the RSecretEnvRespose according to certain embodiments of the disclosure.

FIG. 12B schematically shows a format of a root secret cod response (RSecretResponse) packet and an example of the RSecretResponse according to certain embodiments of the disclosure.

FIG. 13 schematically shows a format of an encoded data packet (EncodedDataPacket) and an example of the EncodedDataPacket according to certain embodiments of the disclosure.

DETAILED DESCRIPTION

Figure 1:
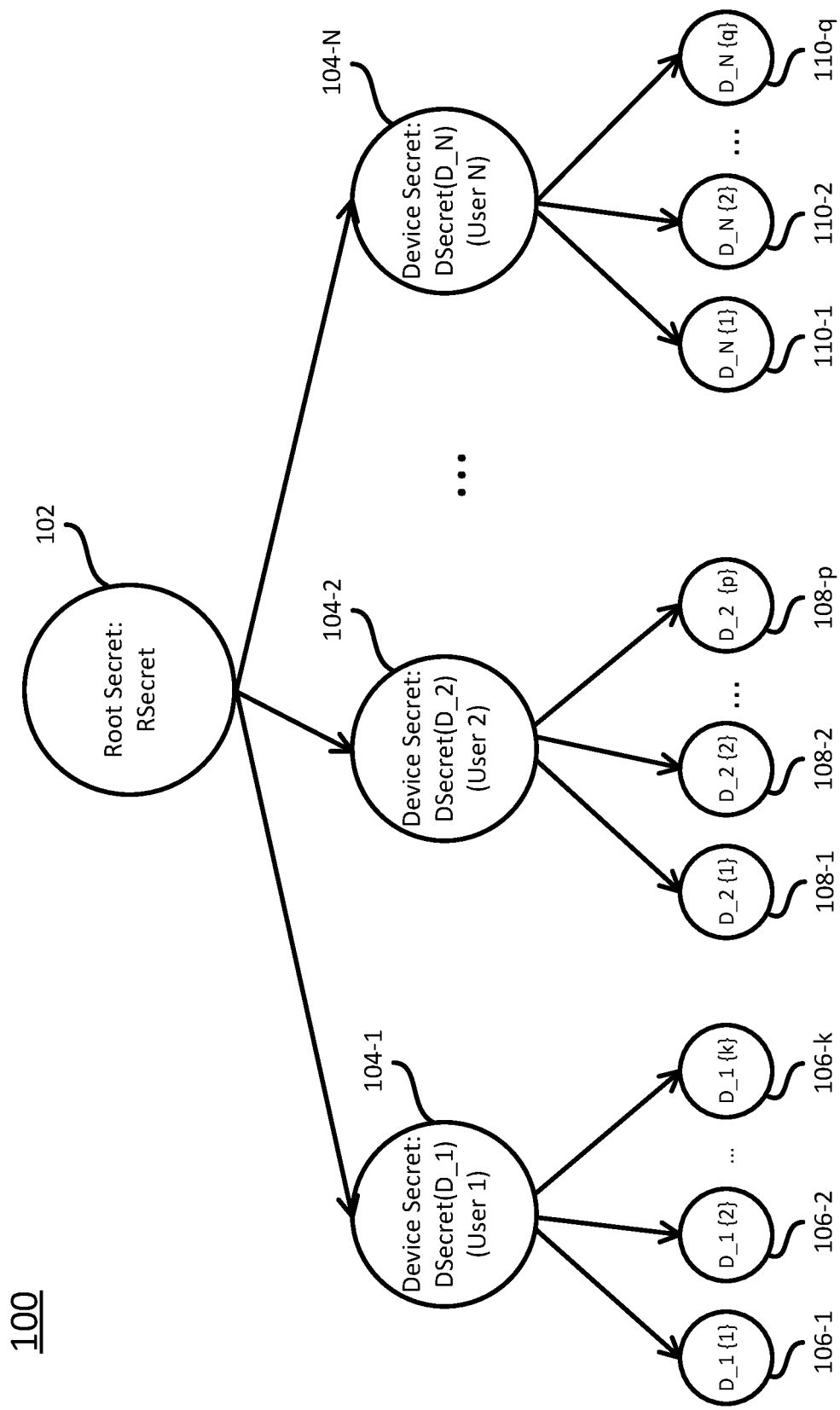
FIG. 1 schematically shows a key hierarchy according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term "HMAC" is the abbreviation of Hash-based Message Authentication Code. It is code calculated by a cryptographic hash function and a secret cryptographic key. The term "KDF" is the abbreviation of Key Derivation Function. It is a formula used to calculate a cryptographic key with some parameters as input like timestamp number, byte array and string. The term "RSA" is a public key and private key encryption algorithm referred as asymmetric encryption. The term "fingerprint" refers to a device fingerprint, which is a piece of information collected about a device, e.g. a mobile device's network media access control (MAC) address or international mobile equipment identity (IMEI). It can be used to identify the device from which the fingerprint is collected.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspect, the present disclosure, provides a comprehensive solution for mobile devices, especially for mobile apps to establishment sensitive data protection based on their device fingerprints without involving heavy key management on both server and mobile sides. FIG. 1 schematically shows a key hierarchy according to certain embodiments of the present disclosure. The key hierarchy is used to encrypt data and security is guaranteed through the encryption. As shown in FIG. 1, the hierarchy includes a high level root secret or root secret code (RSecret) 102, an intermediate level device secret or device secret code (DSecret) 104, and a low level data key (D_u) 106. The RSecret 102 is stored in a hardware security module (HSM) with highest security. It is the oracle from which all other keys are derived. There are a number of N DSecrets, D_1 (104-1), D_2 (104-2), . . . , D_N (104-N), that are derived from the RSecret 102. Each of the DSecret D_1 to D_N is unique to a corresponding device, such as a mobile device. Each DSecret 104 is derived from the RSecret 102 and the corresponding device's fingerprint which uniquely identifies the mobile device. For each device with a DSecret, all data keys used to encrypt the sensitive data are derived from that DSecret. The D_u is the key used to encrypt data transmitted over, for example, HTTP. Each D_u is derived from the corresponding DSecret and the timestamp value when the data key is generated. The D_u is generated on-demand when the mobile device or the backend service needs to encrypt data before sending that data, or decrypt the data after receiving the data that is encrypted. As a result, each D_u is unique to each transmitted data packet, which guarantees the highest security level. As shown in FIG. 1, the DSecret D_1 is used to derive the data keys D_1 {1} (106-1), D_1{2} (106-2), . . . , D_1 {k} (106-k); the DSecret D_2 is used to derive the data keys D_2{1} (108-1), D_2{2} (108-2), . . . , D_2{p} (108-p); . . . ; the DSecret D_N is used to derive the data keys D_N{1} (110-1), D_N{2} (110-2), . . . , D_N{q} (110-q).

Figure 2:
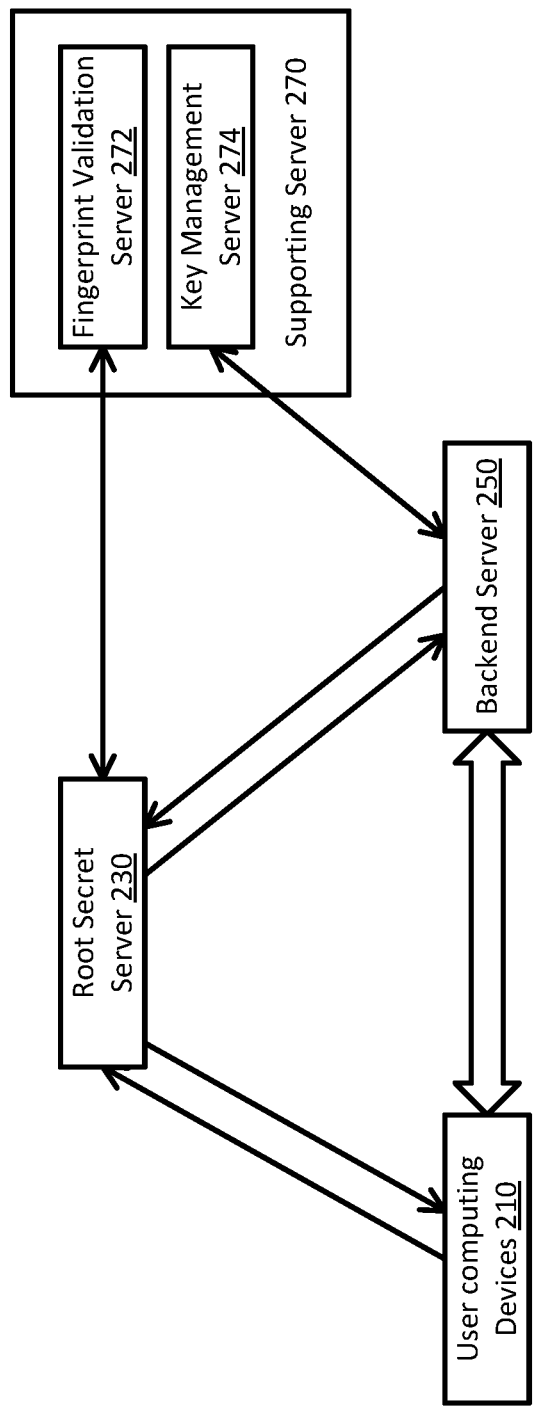
FIG. 2 schematically shows a system of authenticated encryption based on device fingerprint according to certain embodiments of the present disclosure.

FIG. 2 schematically shows a system of authenticated encryption based on device fingerprint according to certain embodiments of the present disclosure. As shown in FIG. 2, the system 200 includes a user computing device 210, a root secret server 230, a backend server 250, and optionally supporting servers 270. The supporting servers 270 may include a fingerprint validation server 272 and a key management server 274. The root secret server 230 provides a root secret service (or an RSecret service), the backend server 250 provides a backend service, the fingerprint validation server 272 provides a fingerprint validation service, and the key management server 274 provides a key management service. For convenience of the description, the root secret server and the root secret service, the backend server and the backend service, the fingerprint validation server and the fingerprint validation service, and the key management server and the key management service, may respectively be used interchangeably in this disclosure.

The user computing device 210, the root secret server 230, and the backend server 250 are in communication with each other, for example through a network or other types of interfaces. The root secret server 230 and the backend server 250 are in communication with the supporting servers 270 via a network or other types of interfaces. In certain embodiments, each of the above mentioned networks may be a wired or wireless network, and may be of various forms, such as a public network and a private network. Examples of the networks may include, but not limited to, a local-area network (LAN) or a wide area network (WAN) including the Internet. In certain embodiments, two or more different networks and/or interfaces may be applied to connect the devices 210, 230, 250 and 270. In certain embodiment, the network may also be a system interface or a universal serial bus (USB) interface.

The user computing device 210 may be a mobile device, which is configured to perform a client application (app) thereon (iOS® or Android®). The app is configured to, when in operation, request the DSecret from the RSecret service provided by the root secret server 230. The operated app is further configured to encrypt sensitive data when transferring the data to the backend service provided by the backend server 250.

The root secret server 230 provides the RSecret service, which is a web service used to store RSecret or RSecrets. The RSecret is on top of the key hierarchy. The root secret service 230 is configured to generate and provide DSecret to the user computing devices 210 when that user computing device 210 requests its DSecret. The root secret service 230 is further configured to provide RSecret to the backend service 250.

The backend server 250 is configured to provide a backend service. The backend server service 250 is configured to exchange data with the app operated on the user computing device 210. The sensitive data being transferred between the app and the backend service 250 needs to be encrypted.

The fingerprint validation server 272 is configured to provide a fingerprint validation service. The fingerprint validation service 272 is configured to receive a request from the RSecret service, and validate whether the fingerprint of the user computing device 210 stored in the request is valid or not, so as to authenticate the legitimacy of the user computing device 210. In certain embodiments, the fingerprint is extracted from device information itself, such as international mobile equipment identity (IMEI), pre-deployed hardware serial number, media access control (MAC) addresses, or other read-only information from the user computing device 210 which is supposed to be unique per device.

The key management server 274 is configured to provide a key management service. In certain embodiments, the key management service may only provide symmetric key management between the RSecret service and all the server side (web services), including the backend service.

In certain embodiments, the root secret server 230 and the backend server 250 are separate servers. In certain embodiments, the root secret server 230 and the backend server 250 may be the same server. In certain embodiments, the root secret server 230 and the backend server are located in the cloud.

Figure 3:
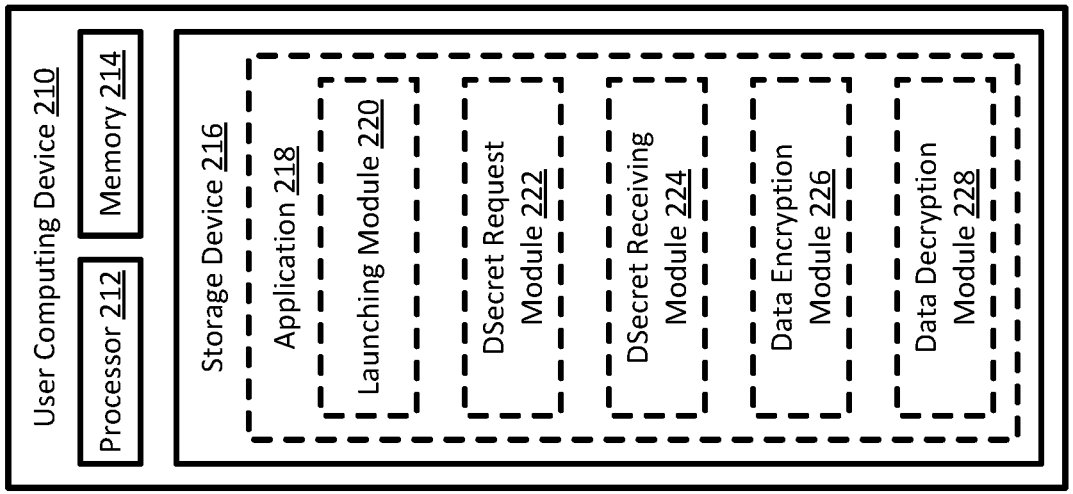
FIG. 3 schematically depicts a user computing device according to certain embodiments of the present disclosure.

FIG. 3 schematically depicts a user computing device according to certain embodiments of the present disclosure. In certain embodiments, the user computing device 210 may be a mobile device, a tablet, a cloud computer, a general-purpose computer, a headless computer, a wearable device, or a specialized computer, which provides apps running on the user computing device 210. As shown in FIG. 3, the user computing device 210 may include, without being limited to, a processor 212, a memory 214, and a storage device 216. In certain embodiments, the user computing device 210 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 212 may be a central processing unit (CPU) which is configured to control operation of the user computing device 210. The processor 212 can execute an operating system (OS) or other applications of the user computing device 210. In some embodiments, the user computing device 210 may have more than one CPU as the processor, such as two CPUs, four CPUs, eight CPUs, or any suitable number of CPUs. The memory 214 can be a volatile memory, such as the random-access memory (RAM), for storing the data and information during the operation of the user computing device 210. In certain embodiments, the memory 214 may be a volatile memory array. In certain embodiments, the user computing device 210 may run on more than one memory 214. The storage device 216 is a non-volatile data storage media for storing the OS (not shown) and other applications of the user computing device 210. Examples of the storage device 216 may include non-volatile memory such as flash memory, memory cards, USB drives, hard drives, floppy disks, optical drives, solid-state drive (SSD), or any other types of data storage devices. In certain embodiments, the storage device 216 may be a local storage, a remote storage, or a cloud storage. In certain embodiments, the user computing device 210 may have multiple storage devices 216, which may be identical storage devices or different types of storage devices, and the applications of the user computing device 210 may be stored in one or more of the storage devices 216 of the user computing device 210.

As shown in FIG. 3, the storage device 216 includes an application 218. The application 218 is configured to obtain DSecret from the RSecret service 230 and communicate encrypted data with the backend service 250 using data keys. The application 218 includes, among other things, a launching module 220, a DSecret request module 222, a DSecret receiving module 224, a data encryption module 226, and a data decryption module 228.

The launching module 220 is configured to launch and initialize the application 218. The DSecret request module 222 is configured to, during deployment of the user computing device 210 and after launching, prepare a device secret request DSecretEnvRequest packet, and send the DSecretEnvRequest to the RSecret service 230. In certain embodiments, the DSecret request module 222 is configured to read device fingerprint (Devinfo{u}), generate randomly a key X, obtain a public key of the RSecret service 230, encrypt the Devinfo{u} and the key X using the public key obtained from the RSecret service 230, and encoding the encrypted data so as to form the DSecretEncRequest. In certain embodiments, the DSecretEnvRequest and the plain DSecretRequest respectively have the format shown in FIG. 9A and FIG. 9B. In certain embodiments, the ciphertext of the DSecretEnvRequest after encryption is C, and C=Enc_{PubK}(Devinfo{u}, X), where PubK is a public key provided by the root secret service 230, Devinfo{u} is the fingerprint of the user computing device 210, X is the key provided by the user computing device, which may be a symmetric key, and the fingerprint Devinfo{u} and the key X are main components of the plaint DSecretRequest. The public key may be an authenticated public key because it can be verified by a pre-defined/pre-loaded certificate authority (CA) on the user computing device 210. The public key, together with a private key stored in the root secret service 230 associated with the public key, form a pair of asymmetrical keys. In certain embodiments, the public key and the private key are distributed in advance. In certain embodiments, the key X is a symmetric key.

The DSecret receiving module 224 is configured to, upon receiving the DSecretResponse from the RSecret service 230, retrieve the DSecre{u} from the DSecretResponse, and store the DSecret{u}. The DSecret{u} may be stored in the DSecret receiving module 224 or a specialized storage module in the storage device 216. In certain embodiments, the DSecretResponse includes the DSecret{u} and is encrypted using the key X, and the DSecret receiving module 224 first decodes and decrypts the DSecretResponse, and then retrieves the DSecret{u}. In certain embodiments, the DSecretResponse has the form shown in FIG. 10. In certain embodiments, the ciphertext of the DSecretResponse is C', and the DSecret receiving module 224 decrypts the ciphertext C' by: Dec_{X}(C')=error, DSecret{u}, so as to obtain the DSecret{u}. In certain embodiments, when the vale of error is 0, it indicates that the fingerprint of the user computing device 210 has passed the validation by the fingerprint validation service 272, and the calculated DSecret{u} is good, so that the DSecret receiving module 224 can store the DSecret{u} in local memory for future use. Otherwise, if the value of error is not 0, the user computing device 210 uses a backup DSecret which may be a hard-coded value universally the same across all client computer devices.

The data encryption module 226 is configured to, after deployment and during operation, generate a data key for sensitive data, encrypt the sensitive data using the data key and encode the encrypted data with related information to form an encoded data packet (EncodedDataPacket), and send the EncodedDataPacket to the backend service 250. In certain embodiments, the data encryption module 226 is configured to generate the data key based on the DSecret{u} received from the RSecret service 230 and stored in the user computing device 210. In certain embodiments, the data encryption module 226 constructs the data key using the timestamp value of when the packet is generated, the hash value of the device information hdid, where hdid=H(Devinfo{u}), the name of the application 218, and the DSecret{u}. In certain embodiments, the EncodedDataPacket has a format shown in FIG. 13, where the sensitive data is encrypted using the constructed data key, and stored as a string in the field of "cipher."

The data decryption module 228 is configure to, after deployment and during operation, receive an EncodedDataPacket from the backend service 250, decode the EncodedDataPacket to obtain encrypted data, H(Devinfo{u}), timestamp, application name, etc., generate a data key for the encrypted data, and decrypt the encrypted data using the generated data key, so as to obtain sensitive data embedded in the EncodedDataPacket. In certain embodiments, the data decryption module 228 is configured to generate the data key based on the DSecret{u}, the hash value of the device information, the name of the application extracted during the above decoding or stored in the user computing device 210. In certain embodiments, the EncodedDataPacket prepared by the backend service 250 and the EncodedDataPacket prepared by the user computing device 210 has the same format, such as shown in FIG. 13.

Figure 4:
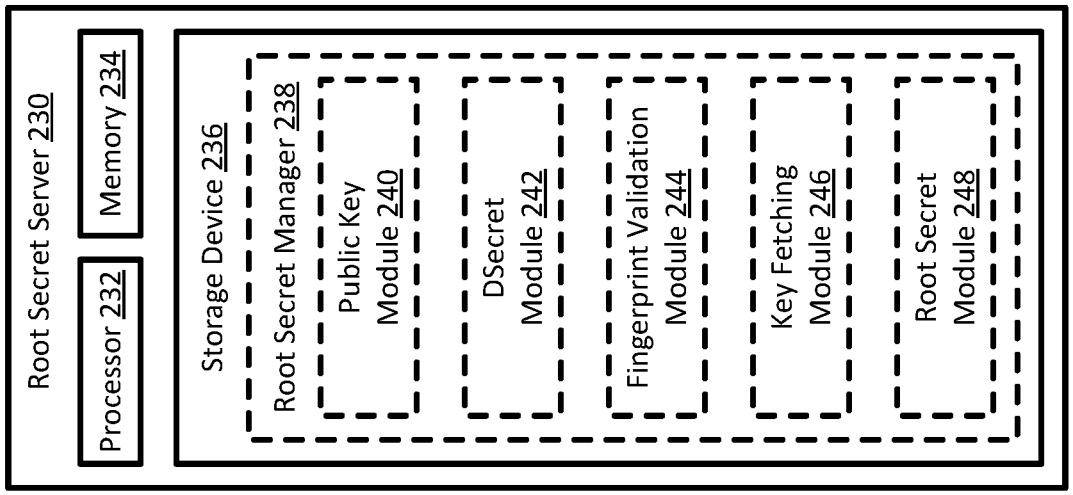
FIG. 4 schematically depicts a root secret server according to certain embodiments of the present disclosure.

FIG. 4 schematically depicts a root secret server according to certain embodiments of the present disclosure. In certain embodiments, the root secret server 230 may be a cloud computer, a server computer, a general-purpose computer, or a specialized computer, which provides device secret code (or device secret, or DSecret) and root secret code (or root secret, or RSecret) respectively to the user computing device 210 and the server computing service 250. As shown in FIG. 4, the root secret server 230 includes, without limited to, a processor 232, a memory 234, and a storage device 236. The description of the processor 232, the memory 234 and the storage device 236 is similar to the description of the processor 212, the memory 214, and the storage device 216. But the hardware requirements for the user computing device 210 may be different from that for the root secret server 230, since the user computing device 210 usually provides applications for one or a few users, while the root secret service 230 usually provides services for a large number of user computing devices. The storage device 236 includes a root secret manager 238. The root secret manger 238 has a public key module 240, a DSecret module 242, a fingerprint validation module 244, a key fetching module 246, and a root secret module 248.

The public key module 240 is configured to, upon receiving a request for a public key from the user computing device 210, provide a public key to the user computing device 210, so that the user computing device 210 can use the public key to encrypt the device secret request, i.e., DSecretRequest. In certain embodiments, the public key module 240 is the certificate of the root secret server 230. The public key module 240 is further configured to, after receiving the encrypted DSecretEnvRequest from the user computing device 210, decode the DSecretEnvRequest to obtain the decrypted cipher text C, i.e., DSecretRequest_plain, decrypt the DSecretRequest_plain using the private key associated with the public key, and provide the decrypted request to the DSecret module 242. In certain embodiments, the public key module 240 decrypts the ciphertext C of the DSecretRequest_plain by: Dec{PrvK}(C)=Devinfo{u}, X. That is, by decrypting the ciphertext C using the private key, the fingerprint Devinfo{u} of the user computing device 210 and the key X generated by the user computing device 210 are obtained. The public key module 240 then sends the Devinfo{u} and X to the DSecret module 242.

The DSecret module 242 is configured to, upon receiving the decoded and decrypted DSecretRequest from the public key module 240, specifically the fingerprint Devinfo{u} and the key X, as well as retrieving the root secret from the root secret module 248, validate the fingerprint using the fingerprint validation module 244 via the fingerprint validation module 244, calculate the DSecret{u} specific to the user computing device 210, prepare a response to the DSecretRequest, and send the response to the user computing device 210. To validate the fingerprint, the DSecret module 242 is configured to send the fingerprint Devinfo{u} to the fingerprint validation module 244. In certain embodiments, the public key module 240 may send the finger print Devinfo{u} directly to the fingerprint validation module 244 for validation. After receiving the validation result from the fingerprint validation module 244 that the finger print Devinfo{u} is valid, the DSecret module 242 is configured to generate the DSecret{u} using the formula: DSecret{u}=KDF (RSecret, H(Devinfo{u})), where DSecret{u} is the device secret code specific for the user computing device 210 from which the corresponding DSecretRequest was sent; KDF is a key derivation function which is a formula used to calculate a cryptographic key with some parameters as input like timestamp number, byte array and string; RSecret is the root secret code stored in the root secret service; and H(Devinfo{u}) is the hash value of the fingerprint of the user computing device 210. In certain embodiments, the DSecret module 242 is further configured to prepare the response to the DSecretRequest, that is, DSecretResponse. In certain embodiments, the DSecretResponse has the form shown in FIG. 10. The ciphertext of the DSecretResponse after encryption is C', and C'=Enc{X} (error, DSecret{u}), where X is the key provided by the user computing device 210, error is status of whether the validation is passed or not, and DSecret{u} is the device secret code calculated by the root secret service 230, which is specific for the user computing device 210.

The fingerprint validation module 244 is configured to, upon receiving the fingerprint of the user computing device 210 from the DSecret module 242 (or from the public key module 240), send a validation request to the fingerprint validation service 272 to validate the legitimacy of the user computing device 210, where the validation request includes the fingerprint; receive a validation response from the fingerprint validation server 272; and send the validation result to the DSecret module 242.

The key fetching module 246 is configured to fetch a key from the key management service 274. Specifically, the key fetching module 246 is configured to send a key request to the key management service 274, such that the key management service 274 sends back a key to the root secret module 248. In certain embodiments, the key management service 274 may also send back the key to the key fetching module 246, and the key in the key fetching module 246 is accessibly by the root secret module 248.

The root secret module 248 is configured to manage the root secret of the root secret service 230. In certain embodiments, the management may include storing one or more root secret codes, and optionally updating the root secret code in a pre-determined time interval. In certain embodiments, the management further includes receiving an encoded and encrypted request for root secret code (RSecretEnvRequest) from the backend service 250, decoding the RSecretEnvRequest to obtain the encrypted ciphertext, decrypting the encrypted cyphertext using the fetched key to obtain the request, preparing a response to the decrypted RSecretRequest, encrypting the response using the fetched key, encoding the encrypted response to form the RSecretEnvResponse, and send the RSecretEnvResponse to the backend service 250. In certain embodiments, the management further include providing the root secret code to the DSecret module 242, such that the DSecret module 242 can calculate the device secret code specific to the user computing device 210.

Figure 5:
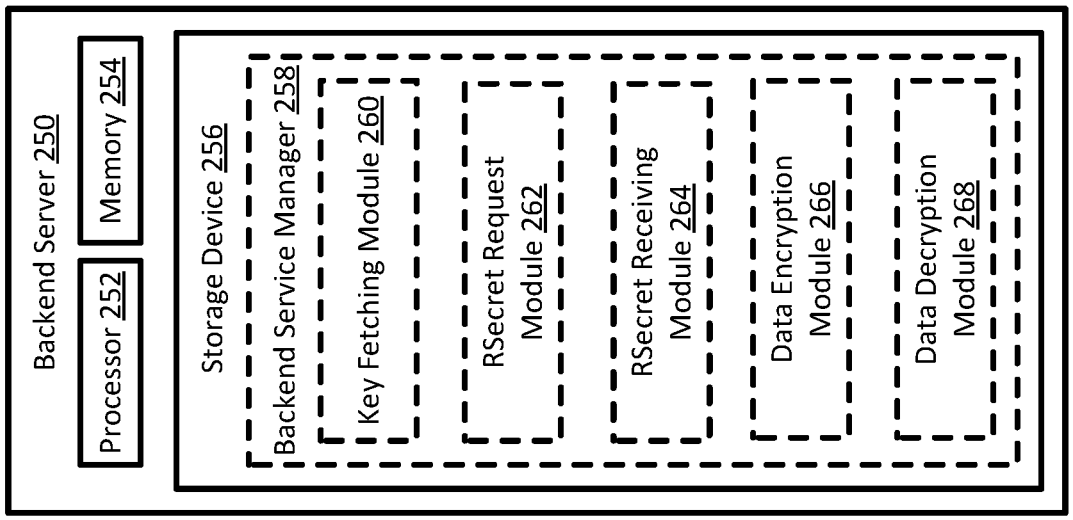
FIG. 5 schematically depicts a backend server according to certain embodiments of the present disclosure.

FIG. 5 schematically depicts a backend server according to certain embodiments of the present disclosure. In certain embodiments, the backend server 250 may be a cloud computer, a server computer, a general-purpose computer, or a specialized computer, which provides backend service to one or more user computing devices 210. As shown in FIG. 5, the backend server 250 includes, without limited to, a processor 252, a memory 254, and a storage device 256. The description of the processor 252, the memory 254 and the storage device 256 is similar to the description of the processor 232, the memory 234, and the storage device 236 of the root secret server 230. The storage device 256 includes a key fetching module 260, a RSecret request module 262, a RSecret receiving module 264, a data encryption module 266, and a data decryption module 268.

The key fetching module 260 is configured to, during initialization of the backend service 250 or in a pre-determined time interval during operation, validate token with the key management service 274 or/and fetch a key from the key management service 274, such that the key management service 274 sends the key to the RSecret request module 262 and the RSecret receiving module 264. In certain embodiments, the key management service 274 may also send the key to the key fetching module 260, and the key in the key fetching module 260 is accessibly by the RSecret request module 262 and the RSecret receiving module 264.

The RSecret request module 262 is configured to, upon receiving the fetched key from the key fetching module 260, prepare a root secret request, encrypt the request using the fetched key and encode the encrypted data to form an encoded and encrypted root secret request (RSecretEnvRequest), and send the RSecretEnvRequest to the root secret server 230. FIG. 11A and FIG. 11B respectively show an example for the RSecretEnvRequest and an example of the RSecretRequest.

The RSecret receiving module 264 is configured to, upon receiving the RSecretEnvResponse from the root secret service 230, decode the RSecretEnvResponse to obtain the encrypted text, decrypt the encrypted text using the fetched key to obtain the decrypted response (RSecretResponse), extract the root secret code (RSecret) from the RSecretResponse, and send the RSecret to the data encryption module 266 and the data decryption module 268. In certain embodiments, the RSecret is stored in the RSecret module 264 and is accessible to the data encryption module 266 and the data decryption module 268.

The data encryption module 266 is configured to, upon receiving a decoded and decrypted data packet and a corresponding response from the data decryption module 268 (which includes hash value of the device fingerprint, the name of the client app, the response to the sensitive data, and optionally the timestamp of the packet), calculate a data key for the response, encrypt the sensitive response, and encode the encrypted response to form an encoded and encrypted data packet (EncodedDataPacket), and send the EncodedDataPacket to the user computing device 210. In certain embodiments, the EncodedDataPacket prepared by the backend service 250 has the format shown in FIG. 13.

When the data encryption module 266 prepares the EncodedDataPacket of the response, it requires the data key ($D\_u\{t\}$) for encryption. In certain embodiments, the data encryption module 266 is configured to calculate the $D\_u\{t\}$ in two steps. First, the data encryption module 266 calculates a device secret code using the hash value of the device fingerprint obtained from the data decryption module 268 and the root secret code received from the RSecret receiving module 264: $DSecret\{u\}=KDF$ (RSecret, H(Devinfo$\{u\}$)). Second, the data encryption module 266 calculates a data key using the DSecret$\{u\}$, the hash value of the device fingerprint, the name of the client application (application 218), and the timestamp (current time) of generating this data packet: $D\_u\{t\}=KDF$ (DSecret$\{u\}$, H(Devinfo$\{u\}$), appName, t). The data encryption module 266 uses the data key $D\_u\{t\}$ to encrypt the response, and encode the encrypted response to form an encoded and encrypted data packet, that is, EncodedDataPacket. In certain embodiments, the sensitive data may not be a response but other type of data for communicating with the application 218 of the user computing device 210, and the data encryption module 266 may still encrypt and encode the EncodedDataPacket similarly, as long as the data encryption module 266 has obtained the hash value of the device fingerprint and the name of the app through previous communication with the user computing device 210.

The data decryption module 268 is configured to, upon receiving an encoded and encrypted data packet (EncodedDataPacket) from the user computing device 210, decode the EncodedDataPacket to obtain the hash value of the fingerprint of the user computing device 210, the name of the app (application 218) generating the sensitive data, the timestamp of the EncodedDataPacket, and the encrypted sensitive data, decrypt the encrypted sensitive data, prepare a response, and send those information to the data encryption module 266. In certain embodiments, the EncodedDataPacket received by the data decryption module 268 has the format shown in FIG. 13.

When the data decryption module 268 receives the EncodedDataPacket from the user computing device 210, it requires the data key ($D\_u\{t\}$) corresponding to that data packet for encryption. In certain embodiments, the data decryption module 268 is configured to calculate the $D\_u\{t\}$ in two steps. First, the data decryption module 268 decodes the EncodedDataPacket to obtain the hash value of the device fingerprint, the name of the client application (application 218), the timestamp when the user computing device generates the data packet, and the encrypted sensitive data, and calculates a device secret code using the obtained hash value of the device fingerprint and the root secret code received from the RSecret receiving module 264: $DSecret\{u\}=KDF$ (RSecret, H(Devinfo$\{u\}$)). Second, the data decryption module 268 calculates a data key using the calculated DSecret$\{u\}$, and the hash value of the device fingerprint, the name of the client application, and the timestamp obtained from the above decoding: $D\_u\{t\}=KDF$ (DSecret{u}, H(Devinfo{u}, appName, t), and decrypt the encrypted sensitive data using the calculated data key.

Figure 6:
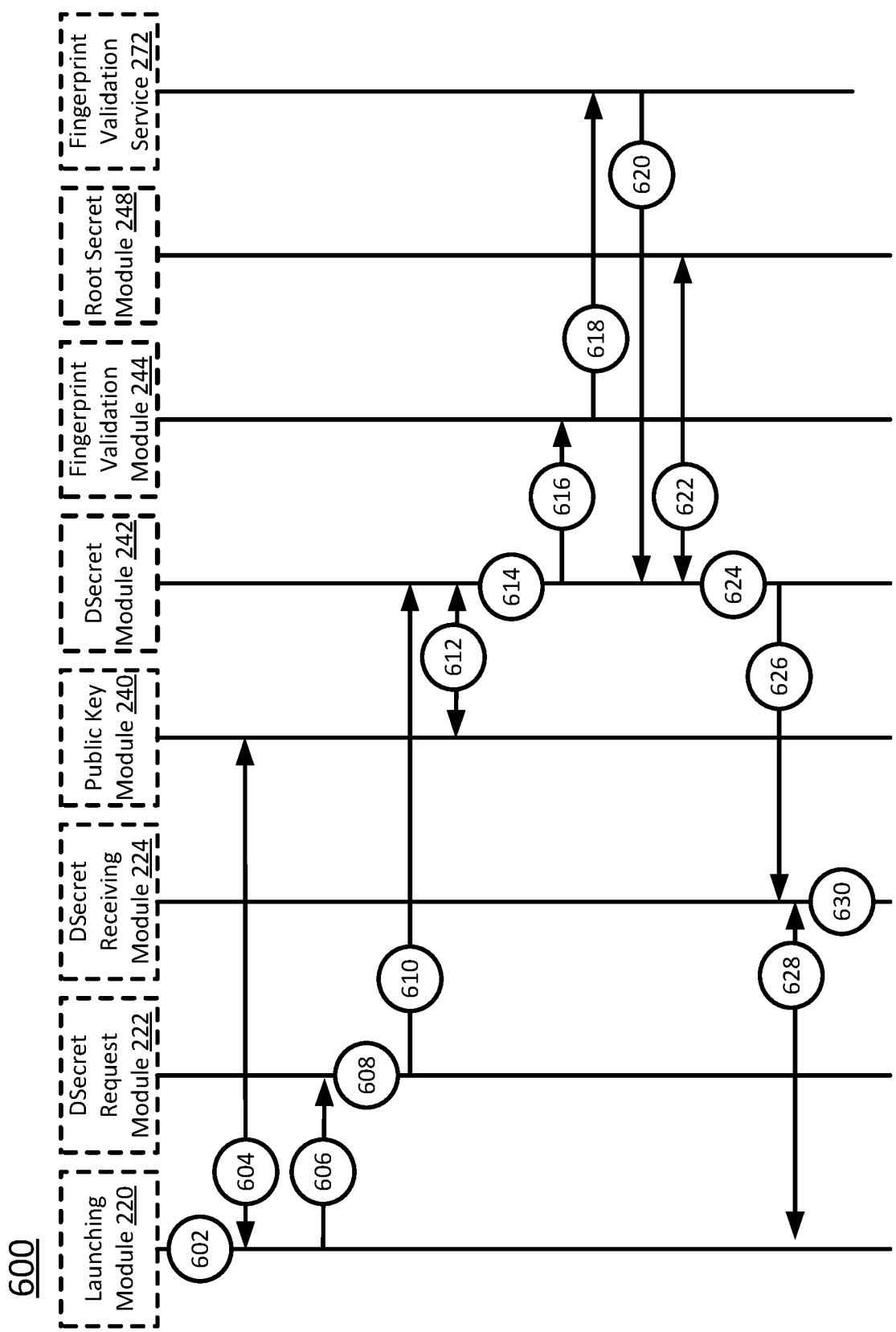
FIG. 6 schematically shows a deployment of a user computing device by communicating with a root secret service according to certain embodiments of the present disclosure.
Figure 7:
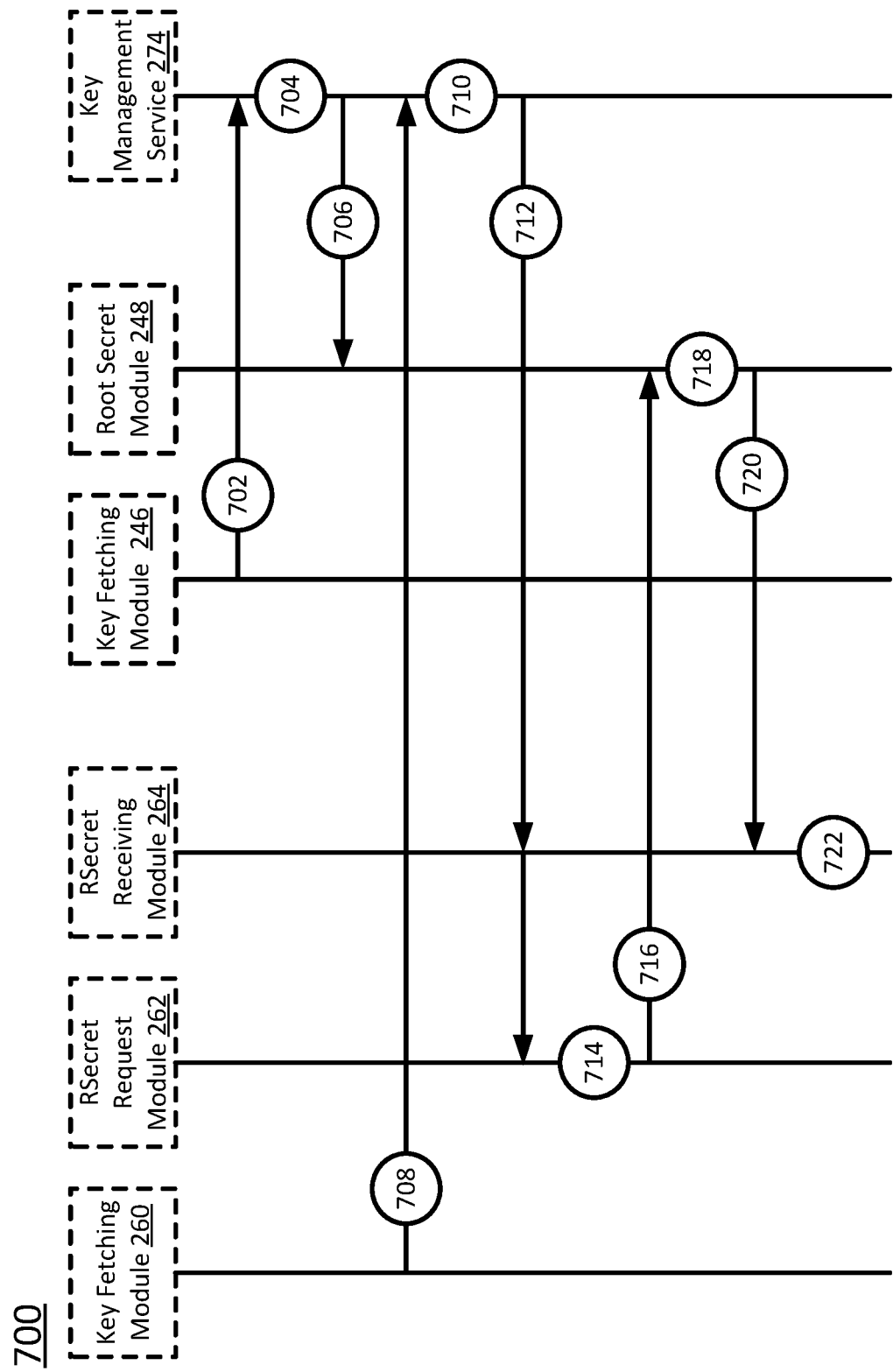
FIG. 7 schematically shows a deployment of a backend service by communicating with the root secret service according to certain embodiments of the present disclosure.
Figure 8:
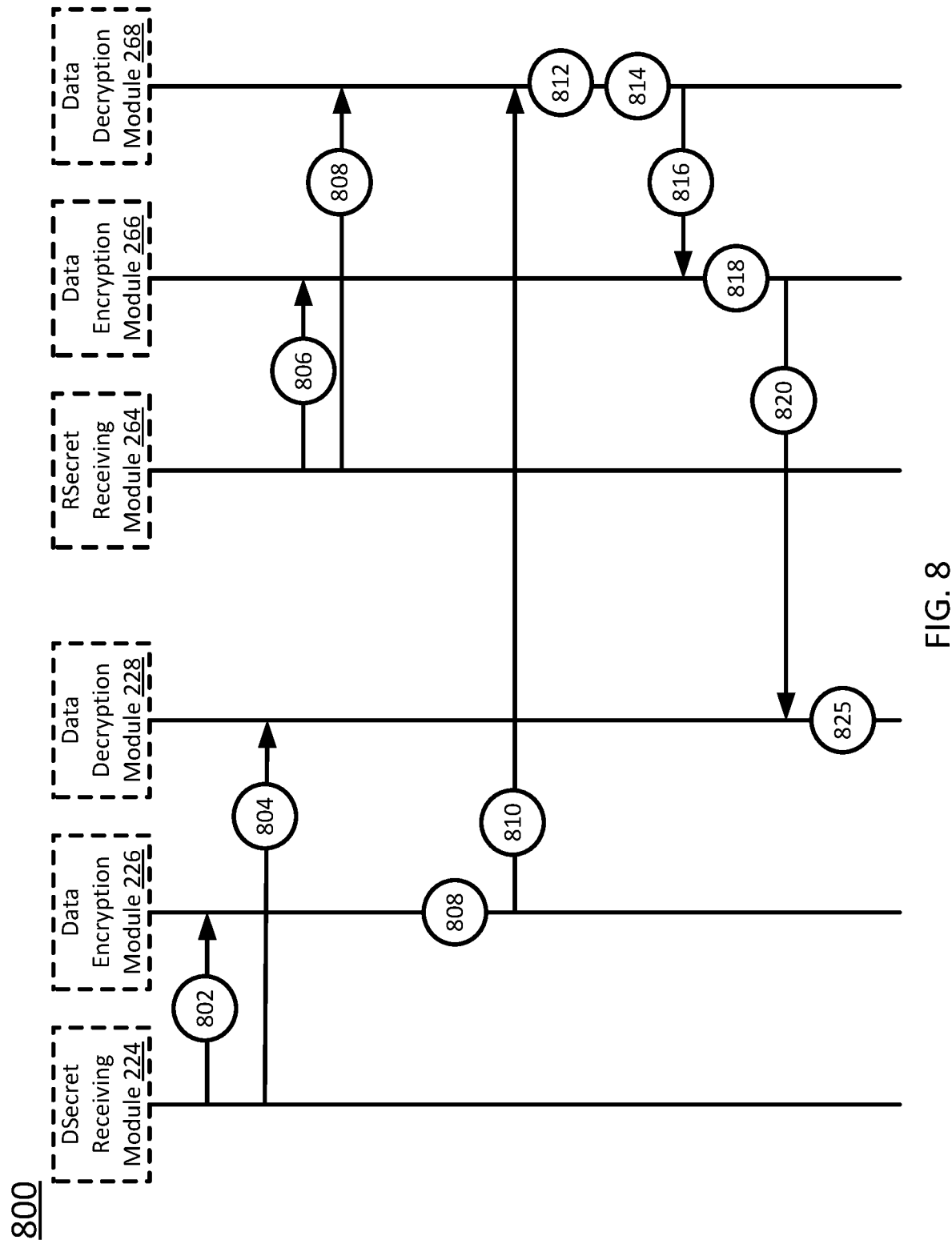
FIG. 8 schematically shows, after the deployment of FIG. 6 and FIG. 7, data transmission between the user computing device and the backend service.

FIGS. 6-8 schematically show a method of operating the system for encrypting data packets. Specifically, FIG. 6 shows the deployment of the user computing device 210 by communicating with the root secret server 230; FIG. 7 shows the deployment of the backend serer 250 by communicating with the root secret server 230; and FIG. 8 shows, after the deployment shown in FIG. 6 and FIG. 7, data transmission between the user computing device 210 and the backend server 250 using the encryption and decryption based on the fingerprint of the user computing device 210.

FIG. 6 schematically shows the deployment of the user computing device 210, that is, how does the user computing device 210 obtain the device secret (DSecrete{u}) from the root secret server 230.

As shown in FIG. 6, at procedure 602, the application 218 is installed on the user computing device 210, and the launching module 220 launches the application 218. When the application 218 is initialized. During initialization, the launching module 220 retrieves the device fingerprint Devinfo{u} and randomly generates a key X. In certain embodiments, the fingerprint of the user computing device 210 is in the format of media access control (MAC) address or IMEI or other form, and is hardcoded in the application 218 and can identify the user computing device 210 uniquely. In certain embodiments, the randomly generated key X is a symmetry key.

At procedure 604, the launching module 220 sends a request to the public key module 240, to retrieve public key, for example, a Rivest_Shamir_Adleman (RSA) public key PubK from the certificate of the root secret service 230, and receives the PubK from the public key module 240.

At procedure 606, the launching module sends the fingerprint Devinfo{u}, the key X and the public key PubK to the DSecret request module 222.

At procedure 608, the DSecret request module 222 prepares a request for device secret code (DSecretEnvRequest). Specifically, the DSecret request module 222 organizes a plain DSecret request packet comprising the fingerprint Devinfo{u} and the key X as shown in FIG. 9B, and then uses the public key PubK to encrypt the plain DSecret request packet and encodes to form the enveloped message DSecretEnvRequest: C=Enc_{PubK}(Devinfo{u}, X), such as the one shown in FIG. 9A.

At procedure 610, the DSecret request module 222 sends the DSecretEnvRequest to the DSecret Module 242.

At procedure 612, upon receiving the DSecretEnvRequest, the DSecret Module 242 decodes the DSecretEnvRequest to obtain the ciphertext C, and retrieves the RSA private key PrvK corresponding to the public key PubK from the public key module 240.

At procedure 614, the DSecret Module 242 decrypts the cipher text C using the private key PrvK to obtain the device fingerprint Devinfo{u}, key X, and other related information: Dec_{PrvK}(C)=Devinfo{u}, X.

At procedure 616, the DSecret Module 242 sends the Devinfo{u} to the fingerprint validation module 244.

At procedure 618, the fingerprint validation module 244 prepares a fingerprint validation request to the fingerprint validation service 272, where the request include the device fingerprint Devinfo{u}.

At procedure 620, the fingerprint validation service 272, upon receiving the request having the Devinfo{u}, validate the fingerprint Devinfo{u} of the user computing device, where the fingerprint validation service 272 may determine whether the fingerprint Devinfo{u} is legitimate or not; and then sends the validation result to the DSecret module 242 (or sends the result to the DSecret module 242 via the fingerprint validation module 244).

At procedure 622, the DSecret module 242 retrieves the root secret code RSecret from the root secret module 248.

At procedure 624, upon receiving the validation result of the fingerprint Devinfo{u} from the fingerprint validation service 272 and the root secret code RSecret from the root secret module 248, the DSecret module 242 calculates the device secret DSecret{u} specific for the user computing device 210: DSecret{u}=KDF(RSecret, H(Devinfo{u})). H(Devinfo{u}) is the hash value of the Devinfo{u}. Then the DSecret module 242 encrypts the DSecret{u} and a status code error using the data key X to obtain the encrypted: C'-Enc {X}(error, DSecret{u}. The error indicates the validation. result. When the Devinfo{u} is an invalid fingerprint, the value of error represents that invalidation. The DSecret module 242 then encodes the encrypted ciphertext C' and other related information to form a response containing the DSecret{u} (DSecretResponse). In certain embodiments, the DSecretResponse has the format as shown in FIG. 10.

At procedure 626, after the DSecretResponse is prepared, the DSecret module 242 sends the DSecretResponse to the DSecret receiving module 224 of the user computing device 210.

At procedure 628, in response to receiving the DSecretResponse, the DSecret receiving module 224 retrieves the key X from the launching module 220.

At procedure 630, the DSecret receiving module 224 decodes the DSecretResponse, decrypts the encrypted ciphertext C' using the key X retrieved from the launching module 220, obtains the DSecret{u}: Dec_{X}(C)=error, DSecret{u}, and stores the DSecret{u} in the memory 214 for future use. If the fingerprint is valid, the error is 0, the D,Secret{u} is saved in the local memory. Otherwise, if the fingerprint is not valid, error is not 0, and the DSecret module 224 use the backup DSecret which is a hard-coded value universally same across all clients.

Embodiments of certain procedures above may be further defined as follows:

(1) The user computing device 210 reads PubK from the certificate of the root secret servicer 230, encrypts request including the fingerprint and data key X, and sends it to the root secret service 230.

User computing device→Root secret service: Encrypt with the PubK.

C=Enc_{PubK}(Devinfo{u}, X)

C is the ciphertext after encryption.

(2) Root secret service 230 decrypts C.

Dec_{PrvK}(C)=Devinfo{u}, X (3) The formula of calculating DSecret:

DSecret{u}=KDF(RSecret, H(Devinfo{u}))

H(Devinfo{u}) is a hash value of the Devinfo of the user computing device 210.

(4) The root secret service 230 sends back the C' encrypted by key X, containing the DSecret{u} and a status code error.

C'=Enc_{X}(error, DSecret{u})

(5) The user computing device 210 receives the C', decrypts it with key X to get DSecret{u} with the following formula:

Dec_{X}(C')=error, DSecret{u})

If succeeded (error is 0), save the DSecret{u} in local memory for future use. Otherwise (error is not 0), use the backup DSecret which is a hard-coded value universally same across all clients.

After the procedures 602 to 630, the deployment of the user computing device 210 is accomplished, and the user computing device 210 has a device specific DSecret{u}. At the same time, the DSecret{u} is calculated by the root secret service 230 on request, and the root secret service 230 doesn't need to store the calculated DSecret{u}.

FIG. 7 schematically shows the deployment of the backend server 250, that is, how does the backend service obtain the root secret (RSecret) from the root secret service 230. Every time when the backend service 250 starts, it first retrieves a root secret (one or multiple) from the root secret service 230 and save it in the memory 254. For security reasons, the backend service 250 doesn't store the RSecret in the storage device 256.

As shown in FIG. 7, at procedure 702, when the root secret service 230 starts, the key fetching module 246 prepares a request, and sends the request to the key management service 274 to fetch a key. This management key is a symmetrical key shared with the backend services 250 and the RSecret server 230, and is used to protect transmission of the root secret.

At procedure 704, in response to receiving the request, the key management service 274 provides the key.

At procedure 706, the key management service 274 sends the key to the root secret module 248, and the root secret module 248 keeps the key and the key is ready for further use. In certain embodiments, the key management service 274 may also send the key to the key fetching module 246, and the root secret module 248 communicate with the key fetching module 246 to receive or retrieve the key immediately after the key fetching module 246 receives the key, or when the key is needed for the root secret module 248.

At procedure 708, when the backend service 250 starts, the key fetching module 260 prepares a request, and sends the request to the key management service 274 to fetch the key. The key requested by the root secret servicer 230 and the key requested by the backend service 250 are the same key.

At procedure 710, in response to receiving the request, the key management service 274 provides the key.

At procedure 712, the key management service 274 respectively sends the key to the RSecret request module 262 and the RSecret receiving module 264, and the RSecret request module 262 and the RSecret receiving module 264 keep the key for future use. In certain embodiments, the key management service 274 may send the key to the key fetching module 260, and the RSecret request module 262 and the RSecret receiving module 264 communicate with the key fetching module 260 to receive or retrieve the key immediately after the key fetching module 260 receives the key, or when the key is needed for the RSecret request module 262 and the RSecret receiving module 264.

At procedure 714, upon receiving the key, the RSecret request module 262 prepares a request for root secret code, encrypts the request using the fetched key to form an encrypted request RSecretRequest, and encode the RSecretRequest to form the encoded and encrypted request, i.e., RSecretEnvRequest. Examples of the RSecretEnvRequest and the RSecretRequest are respectively shown in FIG. 11A and FIG. 11B. The format of the request may vary, as long as it contains the request for the root secret code.

At procedure 716, the RSecret request module 262 sends the request RSecretEnvRequest to the root secret module 248.

At procedure 718, in response to receiving the request RSecretEnvRequest, the root secret module 248 decodes the RSecretEnvRequest to obtain the encrypted request, decrypt the encrypted request using the key to obtain the decrypted request, and in response to the decrypted request, prepares a response (RSecretResponse) containing the root secret code, encrypts the RSecretResponse using the fetched key, and encode the encrypted response to form the encoded and encrypted response, i.e., RSecretEnvResponse. Examples of the RSecretEnvResponse and the RSecretResponse are respectively shown in FIG. 12A and FIG. 12B. The format of the request may vary, as long as it contains the root secret code.

At procedure 720, after preparing the response RSecretEnvResponse, the root secret module 248 sends the RSecretEnvResponse to the RSecret receiving module 264.

At procedure 722, in response to receiving the response RSecretEnvResponse, the RSecret receiving module 264 decode and decrypt the RSecretEnvResponse using the key, and obtains the root secret code from the decoded and decrypted response. Now the backend service 250 is ready for secure data transmission.

After the procedures 702-722, the deployment of the backend server 250 is accomplished, and the server computing device 250 has the root secret code, which can be used to calculate device secret code and data key. The data key is then used for secure transmission of sensitive data.

FIG. 8 schematically shows the transmission of data packets securely between the user computing device 210 and the backend service 250, after deployment of the computing device 210 and the backend service 250.

As shown in FIG. 8, sensitive data is transferred between two sides: the user computing device 210 and the backend service 250. One side generates a data key D_u{t} which is a symmetric key and uses it to encrypt the data before sending the data out. The other side needs to generate the same data key D_u{t} so that it can use the key to decrypt the ciphertext after receiving it. The formula of generating the data key D_u{t} is again listed as the following:

D_u{t}=KDF(DSecret{u}, H(Devinfo{u}), app_name, t,)

The key metadata to calculate the data key includes the app name app_name, the timestamp value t and the hash value of the device information namely fingerprint H(Devinfo{u}). The data key is generated on demand and specific to the piece of the data it encrypts. All the metadata used to generate the data key specific to this encrypted data as ciphertext should be carried together during the HTTP transmission so that the receiving side can get them and recover the same data key D_u{t} to decrypt it. As a result, the ciphertext, key metadata together with other information are put together and encoded in a special format as the EncodedDataPacket.

From the user computing device 210 side, at procedure 802, the DSecret receiving module 224, after receiving the DSecretResponse from the root secret service 230 and decoding and decrypting the DSecretResponse to obtain the device secret code DSecret{u}, sends the DSecret{u} to the data encryption module 226. In certain embodiments, the data encryption module 226 may also retrieve the DSecret{u} when it needs to encrypt data.

Further, at procedure 804, the DSecret receiving module 224 also sends the DSecret{u} to the data decryption module 228. In certain embodiments, instead of sending the DSecret{u}, the data decryption module 228 may also retrieve the DSecret{u} from the DSecret receiving module 224 when the data decryption module 228 needs to decrypt data.

From the backend service 250 side, at procedure 806, the RSecret receiving module 264, after receiving the RSecretEnvResponse from the root secret service 230 and decoding and decrypting the RSecretEnvResponse to obtain the root secret code RSecret, sends the RSecret to the data encryption module 266. In certain embodiments, the data encryption module 266 may also retrieve the RSecret when it needs to encrypt data.

Further, at procedure 808, the RSecret receiving module 264 also sends the RSecret to the data decryption module 268. In certain embodiments, instead of sending the RSecret by the RSecret receiving module 264, the data decryption module 268 may retrieve the RSecret from the RSecret receiving module 264 when the data decryption module 268 needs to decrypt data.

When the application 218 of the user computing device 210 needs to send sensitive data to the backend service 250 securely, at procedure 808, the data encryption module 226 encrypts the sensitive data using the corresponding data key and encodes the encrypted data to obtain encoded and encrypted data packet, named EncodedDataPacket. The encryption is performed using the data key D_u{t}, which is calculated by: D_u{u}=KDF(DSecret{u}, H(Devinfo{u}), app_name, t) The sensitive data is encrypted using D_u{t} to form a ciphertext. The EncodedDataPacket includes the timestamp t, the name of the application app_name, the hash value of the device finger print H(Devinfo{u}), and the ciphertext that is encrypted. All of the fields of the EncodedDataPacket are in plain text format, such as JSON format. In one example, the EncodedDataPacket has the format as shown in FIG. 13.

At procedure 810, the data encryption module 226 of the user computing device 210 sends the EncodedDataPacket to the data decryption module 268 of the backend service 250.

At procedure 812, upon receiving the EncodedDataPacket, the data decryption module 268 decodes the EncodedDataPacket, and calculates the device secret code DSecret{u} using the RSecret obtained from the root secret server 230 and the H(Devinfo{u}) extracted from the decoded EncodedDataPacket by: DSecret{u}=KDF(RSecret, H(Devinfo{u}), and calculates the data key D_u{t} using the calculated DSecret{u} and the H(Devinfo{u}), app_name, t extracted from the decoded EncodedDataPacket by: D_u{t}=KDF(DSecret{u}, H(Devinfo{u}), app_name, t). With the key D_u{t} available, the backend service 250 then decrypts the encrypted data decoded from the EncodedDataPacket using the data key D_u{t}. The KDF used to generate DSecret{u} and D_u{t} is constructed from the irreversible pseudo random function (PRF), such as hash message authentication code (HMAC)/Bcrypt/password-based key derivation function) (PBKDF2).

At procedure 814, in response to the data decrypted from the EncodedDataPacket, the data decrypted module 268 or other modules of the backend service 250 provides a response.

After generating the response, at procedure 816, the data decryption module 268 sends the response, together with the DSecret{u}, H(Devinfo{u}), app_name, and optionally the timestamp t obtained above, to the data encryption module 266.

At procedure 818, the data encryption module 266 encrypts the response and encode to form a new encoded and encrypted data packet EncodedDataPacket, which also has the form as shown in FIG. 13. The encryption key is calculated using the DSecret{u}, H(Devinfo{u}), app_name obtained above, and the current timestamp t corresponding to the generation time of this new EncodedDataPacket.

After encryption and encoding, at procedure 820, the data decryption module 266 sends the EncodedDataPacket to the data decryption module 228 of the user computing device 210.

At procedure 825, in response to receiving the EncodedDataPacket from the backend service 250, the data decryption module 228 decode the EncodedDataPacket, calculates the key D_u{t} using the stored DSecret{u}, the stored or calculated or extracted H(Devinfo{u}), as well as the app_name and t extracted from the decoded EncodedDataPacket using the formula D_u{t}=KDF(DSecret{u}, H(Devinfo{u}), app_name, t), and decrypts the encrypted sensitive data from the decoded EncodedDataPacket using the data key D_u{t}. The application 218 may use the decrypted data by itself, or sends the decrypted data to other applications or modules for performing corresponding functions.

FIG. 9A schematically shows a format of a device secret code request data packet (DSecretEnvRequest) and an example of the DSecretEnvRequest according to certain embodiments of the disclosure. In the embodiment, the packet is in JSON format. In certain embodiments, the user computing device 210 sends the DSecretEnvRequest to the root secret service 230 to request the root secret code from the root secret service 230. The DSecretEnvRequest includes the fields of ciphertype and dsecret_req_cipher. The ciphertype is an integer indicating the cipher algorithm of the asymmetric encryption. The dsecret_req_cipher is a string including the actual plaint text of the device secret code request (DSecretRequest_plain) that has been encrypted by the public key of the root secret service 230.

FIG. 9B schematically shows the actual plaint text of the device secret code request, i.e., DSecretRequest_plain and a real example according to certain embodiments of the present disclosure. In certain embodiments, the DSecretRequest_plain is in JSON format and includes the field of did, skey, ciphertype, version, and ts. The field did is a string of the device fingerprint. The field skey is a string of a symmetric key randomly generated by the application 218. The skey is used to encrypt the device secret code (DSecret) sent back form the root secret service 230. The ciphertype is an integer indicating the cipher algorithm of the symmetric encryption.

FIG. 10 schematically shows a format of a response from the root secret service in response to receiving the request for a device secret code, and an example of the same according to certain embodiments of the present disclosure. The request is the DSecretRequest and the response is named DSecretResponse. The DSecretResponse packet shown in FIG. 10 includes the fields of status_code, status_message, ciphertype, rids, and dsecret_resp_cipher. The status_code is an integer indicating whether the DSecretResponse packet includes a correct device secret code or not. When status_code is 0, the request/response procedure is success and a correct device secret code is returned from the root secret service 230 back to the user computing device 210. If the status_code is not 0, the request/response procedure is failed, no device secret code is provided, and the value of the status_code may indicate the reason of the failure. The ciphertype is an integer, indicating the cipher algorithm, which is the same as that in the DSecretRequest. The ridx is an integer that is the index of the root secret service 230. The root secret service 230 can select one from multiple root secrets when generating the device secret code, i.e., DSecret. In certain embodiments, the root secret service 230 may update its root secret code regularly, and the user computing device 210 updates its device secret code correspondingly by sending a request to the root secret service 230 in a pre-determined interval.

FIG. 11A schematically shows a format of an encoded and encrypted root secret code request (RSecretEnvRequest) packet and an example of the RSecretEnvRequest according to certain embodiments of the disclosure. In the embodiment, the packet is in JSON format. In certain embodiments, the backend service 250 sends the RSecretEnvRequest to the root secret service 230 to request the root secret code therefrom. The RSecretEnvRequest includes the fields of rsecret_req_cipher and ciphertype. The rsecret_req_cipher is a string including the RSecretRequest encoded in the Base64 format. The ciphertype is an integer indicating the cipher type used in the encryption. The key for the encryption is fetched from the key management server 274.

FIG. 11B schematically shows a format of a root secret code request (RSecretRequest) packet and an example of the RSecretEnvRequest according to certain embodiments of the disclosure. In certain embodiments, the RSecretRequest is in JSON format and includes the field of service_name, ts, and ridx. The field service_name is a string of the name of the backend service. The ts is an integer of the timestamp value of when the packet is generated. The ridx is an integer of the index of the currently used root secret, starting from 0. The RSecretRequest is encoded and form a part of the above RSecretEnvRequest shown in FIG. 11A.

FIG. 12A schematically shows a format of an encrypted response packet in response to the root secret code request, and an example of the RSecretEnvRespose according to certain embodiments of the disclosure. In the embodiment, the (RSecretEnvResponse) packet is in JSON format. In certain embodiments, the root secret service 30 sends the RSecretEnvResponse to the backend service 250 to provide the root secret code to the backend service 250. As shown in FIG. 12A, the RSecretEnvResponse includes the fields of ciphertype and rsecret_res_cipher. The ciphertype is an integer indicating the cipher type used in the encryption, and the key for the encryption is fetched from the key management service 274. The rsecret_req_cipher is a string including the RSecretResponse encoded in the Base64 format.

FIG. 12B schematically shows a format of a root secret code response (RSecretResponse) packet and an example of the RSecretResponse according to certain embodiments of the disclosure. In certain embodiments, the RSecretResponse is in JSON format and includes the field of status_code, status_message, ts, ridx, rsecret_string, and rsecret_digest. The field status_code is an integer indicating whether the RSecretResponse packet includes a correct root secret code or not. When status_code is 0, the request/response procedure is success, and a correct root secret code is returned from the root secret service 230 back to the backend service 250. If the status_code is not 0, the request/response procedure is failed, and no root secret code is provided, and the value of the status_code may indicate the reason of the failure. The field status message is a string, providing status message corresponding to the status_code. The field ts is an integer recording the timestamp value of when the packet is generated. The ridx is an integer that is the index of the currently used root secret starting from 0. For example, the root secrets are indexed so the index starts from 0. If there are 3 root secrets used in the system, those secrets are indexed as 0, 1, and 2. The field rsecret_string is a string of the encrypted root secret code (one or more). The field rsecret_digest is a string, representing the digest of the encrypted root secret and encoded in Base64 format. If multiple root secrets are returned, each root secret has its own corresponding digest.

FIG. 13 schematically shows a format of an encoded and encrypted data packet (EncodedDataPacket) and an example of the EncodedDataPacket according to certain embodiments of the disclosure. In certain embodiments, the EncodedDataPacket is in JSON format. As shown in FIG. 13, the EncodedDataPacket includes the field of version, ts, hdid, appname, ciphertype, ridx, and cipher. The field version is a string indicating the version number of the application 218. The field ts is a long integer representing the timestamp value of when the packet is generated. The field hdid is a string representing the hash value of the device fingerprint. The hash value is derived based on: hdid=H(Devinfo{u}). The field appname is a string containing the name of the application 218. The field ciphertype is an integer representing the index of the currently used root secret starting from 0. The field cipher is a string having the encrypted plaintext payload.

In certain embodiments, the request, response and data packets shown in FIGS. 9A, 9B, 10, 11A, 11B, 12A, 12B and 13 are all in JSON format. In certain embodiments, those packets may also be in other text format.

In summary, certain embodiments of the present disclosure, among other things, have the following advantages:

a) The present disclosure provides a lightweight key management for mobile apps without pre-deployed secrets;

b) The present disclosure provides and end-to-end (the mobile app and the server side) data protection for the optional fields instead of the whole transport layer protection;

c) The present disclosure provides authentication on mobile app based on device fingerprint;

d) The present disclosure uses comprehensive key derivation function to ensure that the data fields can be encrypted with an individual key per device, per app, and per request;

e) The present disclosure provides on-demand device secret calculation on the server side to eliminate a huge key storage for deployed mobile devices.

The key technology according to certain embodiments of the present disclosure provides a lightweight key management based on mobile device fingerprints. Deployed device secrets derived from the mobile fingerprint mixing with the root secret make sure that: (1) devices are authenticated; (2) all devices secrets can be calculated from the root secret on the server side without any extra storage; (3) device secrets are unique and as well as each data key is derived uniquely per device, per app, and per request; and (4) support customized encryption on selected fields without encrypting the whole packet or the whole channel.

In certain embodiments, TLS/HTTPS may be used as an alternative solution. But deployed device credentials are not easy because: (1) if we adopt symmetric key on each device, the server cannot afford a huge amount of key storage at local or long latency caused by query device key from distributed key storage; and (2) if we adopt asymmetric keys on each device, the asymmetric key should be pre-installed because no device verification can be conducted in advanced, making deployment impractical.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

1. Chinese patent application No. CN102664898A, Fingerprint identification-based encrypted transmission method, fingerprint identification-based encrypted transmission device and fingerprint identification-based encrypted transmission system.
2. U.S. Published Patent Application No. 2010/0211787A1, Chaotic cipher system and method for secure communication.
3. GB2434724A, Secure transactions using authentication tokens based on a device "fingerprint" derived from its physical parameters.
4. U.S. Pat. No. 8,667,265B1, Hardware device binding and mutual authentication.

What is claimed is:

1. A method for encryption and decryption, the method comprising:
   sending, by a user computing device, a device fingerprint of the user computing device to a root secret server, wherein the root secret server has a root secret code, and the root secret server is configured to calculate, in response to receiving the device fingerprint, a device secret code using the device fingerprint and the root secret code, and send the device secret code to the user computing device;
   calculating, by the user computing device, a data key using the device secret code, the device fingerprint, a name of an application generating data, and a timestamp of generating the data;
   encrypting, by the user computing device, the data using the data key to form encrypted data;
   encoding, by the user computing device, the encrypted data with the device fingerprint, the name of the application, and the timestamp to form an encoded data packet, and sending the encoded data packet to a backend server,
   wherein the backend server is configured to:
   obtain the root secret code from the root secret server;
   in response to receiving the encoded data packet, decode the encoded data packet to obtain the encrypted data packet;
   calculate the data key using the root secret code obtained from the root secret server and the device fingerprint, the name of the application, and the timestamp from the encoded data packet; and
   decrypt the encrypted data packet using the data key.

2. The method of claim 1, further comprising, before the step of sending the device fingerprint:
   encrypting, by the user computing device, the device fingerprint using a public key retrieved from the root secret server, wherein the root secret server is further configured to decrypt the fingerprint by the root secret server using a private key associated with the public key, and the public key and the private key form a pair of asymmetric keys.

3. The method of claim 1, wherein the root secret server is further configured to, before calculating the device secret code, validate the device fingerprint using a fingerprint validation service.

4. The method of claim 1, wherein the root secret server is further configured to, before sending the device secret code to the user computing device: encrypt the device secret code using a randomly generated key provided by the user computing device, and the method further comprises, before the step of calculating the data key by the user computing device:
   decrypting, by the user computing device, the encrypted device secret code received from the root secret server using the randomly generated key, and storing the obtained device secret code on the user computing device, wherein the randomly generated key is a symmetric key.

5. The method of claim 1,
   wherein the root secret server is further configured to obtain a management key from a key management service;
   wherein the backend server is further configured to, before obtaining the root secret code from the root secret server:
   obtain the management key from the key management service;
   send a request for requesting the root secret code to the root secret server, the request encrypted by the management key, wherein the root secret server is further configured to decrypt the request using the management key, prepare a response having the root secret key and encrypted by the management key, and send the response to the backend server; and
   receive the response and decrypt the response using the management key to obtain the root secret code; and
   wherein the management key is a symmetric key.

6. The method of claim 1, wherein the data key is a symmetric key and the encrypted data packet is coded by JavaScript Object Notation (JSON).

7. A non-transitory computer readable medium storing computer executable code, wherein the computer executable code, when executed at a processor of a user computing device, is configured to perform the method of claim 1.

8. A method for encryption and decryption, the method comprising:
   obtaining, by a backend server, a root secret code from a root secret server;
   decoding, by the backend server in response to receiving an encoded data packet from a user computing device, the encoded data packet to obtain an encrypted data packet;
   calculating a data key using the root secret code obtained from the root secret server and a device fingerprint, a name of the application, and a timestamp from the encoded data packet; and
   decrypting, by the backend server, the encrypted data packet using the calculated data key,
   wherein the user computing device is configured to send the device fingerprint of the user computing device to the root secret server, calculate the data key using the device secret code received from the root secret server, the device fingerprint, the name of the application generating the data, and the timestamp of generating the data, encrypt the data using the data key to form the encrypted data, encode the encrypted data with the device fingerprint, the name of the application, the timestamp to form the encoded data packet, and send the encoded data packet to the backend server; and wherein the root secret server is configured to calculate, in response to receiving the device fingerprint, the device secret code using the device fingerprint and the root secret code, and send the device secret code to the user computing device.

9. The method of claim 8, wherein the user computing device is further configured to encrypt the device fingerprint using a public key retrieved from the root secret server, the root secret server is further configured to decrypt the fingerprint by the root secret server using a private key associated with the public key, and the public key and the private key form a pair of asymmetric keys.

10. The method of claim 8, wherein the root secret server is further configured to, before calculating the device secret code, validate the device fingerprint using a fingerprint validation service.

11. The method of claim 8, wherein the root secret server is further configured to, before sending the device secret code to the user computing device: encrypt the device secret code using a randomly generated key provided by the user computing device, and the method further comprises:

decrypting, by the user computing device, the encrypted device secret code received from the root secret server using the randomly generated key, and storing the obtained device secret code on the user computing device, wherein the randomly generated key is a symmetric key.

12. The method of claim 8, further comprising:

obtaining, by the backend server, a management key from the key management service;

sending, by the back end server, a request for requesting the root secret code by the backend server to the root secret server, the request encrypted by the management key, wherein the root secret server is configured to obtain the management key from the key management service, decrypt the request using the management key, prepare a response having the root secret key and encrypted by the management key, and send the response to the backend server; and receiving, by the backend server, the response; and decrypting, by the backend server, the response using the management key to obtain the root secret code, wherein the management key is a symmetric key.

13. The method of claim 8, wherein the data key is a symmetric key, and wherein the encrypted data packet is coded by JavaScript Object Notation (JSON).

14. A non-transitory computer readable medium storing computer executable code, wherein the computer executable code, when executed at a processor of a backend server, is configured to perform the method of claim 8.

15. A system for encryption and decryption, the system comprising: a user computing device, a root secret server having a root secret code, and a backend server, wherein:

the root secret server is configured to:

calculate a device secret code using a device fingerprint sent by the user computing device and the root secret code; and send the device secret code to the user computing device;

the user computing device is configured to:

send the device finger print to the root secret server;

calculate a data key using the device secret code received from the root secret server, the device fingerprint, a name of an application generating data, and a timestamp of generating the data;

encrypt the data using the data key to form encrypted data;

encode the encrypted data with the device fingerprint, the name of the application, the timestamp to form an encoded data packet; and send the encoded data packet to the backend server;

the backend server is configured to:

obtain the root secret code from the root secret server;

in response to receiving the encoded data packet: decode the encoded data packet to obtain the encrypted data packet, calculate the data key using the root secret code obtained from the root secret server and the device fingerprint, the name of the application, and the timestamp from the encoded data packet; and decrypt the encrypted data packet using the calculated data key.

16. The system of claim 15, wherein the user computing device is further configured to encrypt the device fingerprint using a public key retrieved from the root secret server;

the root secret server is configured to decrypt the encrypted device fingerprint using a private key associated with the public key; and the public key and the private key form a pair of asymmetric keys.

17. The system of claim 15, wherein the root secret serve is further configured to validate the device fingerprint using a fingerprint validation service.

18. The system of claim 15, wherein the root secret server is configured to encrypt the device secret code using a randomly generated key provided by the user computing device, before sending the device secret code to the user computing device; the user computing device is configured to decrypt the encrypted device secret code using the randomly generated key; and the randomly generated key is a symmetrical key.

19. The system of claim 15, wherein:

the backend server is further configured to: obtain a management key from a key management service, encrypt a request for requesting the root secret code using the management key, send the request to the root secret server, and decrypt a response received from the root secret server using the management key to obtain the root secret code;

the root secret server is further configured to: obtain the management key from the key management service, decrypt the service request using the management key, prepare the response having the root secret key and encrypted by the management key, and send the response to the backend server; and the management key is a symmetric key.

20. The system of claim 15, wherein the data key is a symmetric key, and the encrypted data packet is coded by JSON.

* * * * *